(12) United States Patent
Linsley et al.

(10) Patent No.: US 11,636,346 B2
(45) Date of Patent: Apr. 25, 2023

(54) RECURRENT NEURAL CIRCUITS

(71) Applicant: Brown University, Providence, RI (US)

(72) Inventors: Drew Linsley, Providence, RI (US); Junkyung Kim, London (GB); Thomas Serre, East Greenwich, RI (US); Alekh Karkada Ashok, Karnataka (IN); Lakshmi Narasimhan Govindarajan, Providence, RI (US); Rex Gerry Liu, Providence, RI (US)

(73) Assignee: Brown University, Providence, RI (US)

( * ) Notice: Subject to any disclaimer, the term of this patent is extended or adjusted under 35 U.S.C. 154(b) by 267 days.

(21) Appl. No.: 16/868,392

(22) Filed: May 6, 2020

(65) Prior Publication Data
US 2020/0356862 A1 Nov. 12, 2020

Related U.S. Application Data

(60) Provisional application No. 62/843,872, filed on May 6, 2019.

(51) Int. Cl.
*G06N 3/084* (2023.01)
*G06N 3/063* (2023.01)
*G06N 3/04* (2023.01)

(52) U.S. Cl.
CPC .......... *G06N 3/084* (2013.01); *G06N 3/0481* (2013.01); *G06N 3/063* (2013.01)

(58) Field of Classification Search
CPC ...... G06N 3/084; G06N 3/0481; G06N 3/063; G06N 3/0454; G06N 3/0445
See application file for complete search history.

(56) References Cited

U.S. PATENT DOCUMENTS

| | | | |
|---|---|---|---|
| 4,803,736 A | 2/1989 | Grossberg et al. | |
| 5,109,425 A | 4/1992 | Lawton | |
| 10,431,210 B1 * | 10/2019 | Huang | G06F 40/216 |
| 11,093,819 B1 * | 8/2021 | Li | G06N 3/08 |
| 11,144,813 B1 * | 10/2021 | Kotara | G06N 3/0445 |
| 11,164,066 B1 * | 11/2021 | Dai | G06N 3/084 |
| 11,270,185 B1 * | 3/2022 | Ouyang | G06N 3/004 |
| 2018/0268285 A1 * | 9/2018 | Dasgupta | G06N 3/0445 |

FOREIGN PATENT DOCUMENTS

| | | |
|---|---|---|
| CN | 105740909 B | 6/2017 |
| CN | 108647591 A | 10/2018 |

OTHER PUBLICATIONS

Huang et al., "Scene Labeling using Gated Recurrent Units with Explicit Long Range Conditioning", Computer Vision and Pattern Recognition, Cornell University, arXiv:1611.07485, Mar. 28, 2017, 13 pages.

(Continued)

*Primary Examiner* — Dhaval V Patel
(74) *Attorney, Agent, or Firm* — Adler Pollock & Sheehan P.C.

(57) ABSTRACT

A method includes providing a computer system, the computer system including at least a processor and a memory, the memory including at least an operating system, executing a process in the memory, the process including providing a recurrent circuit model, and converting the recurrent circuit model into a recurrent neural network that can be fit with gradient descent.

5 Claims, 2 Drawing Sheets

(56) References Cited

OTHER PUBLICATIONS

Linsley et al., "Learning Long-Range Spatial Dependencies with Horizontal Gated-Recurrent Units", 32nd Conference on Neural Information Processing Systems, 2018, 13 pages.
Linsley et al., "Robust Neural Circuit Reconstruction from Serial Electron Microscopy with Convolutional Recurrent Networks", Computer Vision and Pattern Recognition, Cornell University, arXiv:1811.11356, Nov. 28, 2018, 16 pages.
Shamwell et al., "A Novel Convolutional Neural Network for Deep-Learning Classification", SPIE, The International Society for Optics and Photonics, Aug. 13, 2016, 4 pages.
Yue et al., "Residual Recurrent Neural Networks for Learning Sequential Representations", Information, vol. 9, No. 56, 2018, 14 pages.
Lohmann et al., "Glycosaminoglycan-based hydrogels capture inflammatory chemokines and rescue defective wound healing in mice" Sci. Transl. Med. 9, eaai9044 (2017) (12 pages).
Ridiandries A, Bursill C, Tan J. Broad-Spectrum Inhibition of the CC-Chemokine Class Improves Wound Healing and Wound Angiogenesis. Int J Mol Sci. Jan. 13, 2017;18(1):155. doi: 10.3390/ijms18010155. PMID: 28098795; PMCID: PMC5297788 (15 pages).

\* cited by examiner

RECURRENT NEURAL CIRCUITS

CROSS REFERENCE TO RELATED APPLICATIONS

This application claims benefit from U.S. Provisional Patent Application Ser. No. 62/843872, filed May 6, 2019, which is incorporated by reference in its entirety.

STATEMENT REGARDING GOVERNMENT INTEREST

This invention was made with government support under grant number IIS-1252951 awarded by NSF and grant number YFA N66001-14-1-4037 awarded by DARPA. The government has certain rights in the invention.

BACKGROUND OF THE INVENTION

The present invention relates generally to, and more particularly to recurrent neural circuits.

Recent successes in deep learning have started to impact neuroscience. Of particular significance are assertions that current neural network architectures achieve "super-human" accuracy in a number of visual tasks ranging from image categorization to segmentation. However, these is evidence that these neural architectures do not effectively generalize beyond the data used for training severely limiting their usability for most real-world applications.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method including providing a computer system, the computer system including at least a processor and a memory, the memory including at least an operating system, executing a process in the memory, the process including providing a recurrent circuit model, and converting the recurrent circuit model into a recurrent neural network that can be fit with gradient descent.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1A:
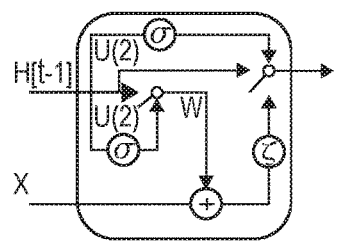
FIG. 1(a) illustrates an exemplary circuit diagram of the gated recurrent unit (GRU).

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention is a general method for taking recurrent circuit models, which are classically fit by hand to simple toy data sets, and converting them into recurrent neural networks that can be fit with gradient descent. Methods of the present invention extends to both ordinary and partial differential equation neural models designed for explaining visual perception.

We applied our method to extending a recurrent circuit that explained human behavioral responses to optical illusions. The original circuit was constrained by neural anatomy and physiology to account for recurrent "classical" and "extra-classical" receptive field effects, also known as center-surround interactions. These neural interactions were simulated with continuous-time dynamics. Our method to convert this model into one that can be trained with gradient descent, and fit to data sets, involves the steps detailed below.

To provide context, this initial model, which we coined the horizontal gated recurrent unit (hGRU), was generated to show that the "horizontal connections" modeled by the original circuit of could improve performance on computer vision tasks, when trained to solve them via gradient descent.

The following details our derivation of this hGRU model from the original circuit. The subsequent section describes a generalization of the hGRU into the feedback recurrent unit (fGRU). This is an extension of the original circuit to simulate either "horizontal connections," for center-surround interactions, or another form of biological feedback, "top-down connections." We see the fGRU as proof that our method can extend nearly any recurrent neuroscience model of visual system function to computer vision.

Below we adapted the model notations to a computer vision audience. Model units are indexed by their 2D positions (x, y) and feature channel k. Neural activity is governed by the following differential equations:

$$\eta H_{xyk}^{(1)} + \varepsilon^2 H_{xyl}^{(1)} = [\zeta X_{xyk} - (oH_{xyk}^{(1)} + \mu) C_{xyk}^{(1)}]_+$$
$$\tau H_{xyk}^{(2)} + \sigma^2 H_{xyk}^{(2)} = [C_{xyk}^{(2)}]_+. \quad (1)$$

where $$C_{xyk}^{(1)} = (W^1 * H^{(2)})_{xyk}$$

$$C_{xyk}^{(2)} = (W^B * H^{(1)})_{xyk},$$

Here, $X \in \mathbb{R}^{W \times H \times K}$ is the feedforward drive (i.e., neural responses to a stimulus), $H^{(1)} \in \mathbb{R}^{W \times H \times K}$ is the recurrent circuit input, and $H^{(2)} \in \mathbb{R}^{W \times H \times K}$ the recurrent circuit output. Modeling input and output states separately allows for the implementation of a particular form of inhibition known as "shunting" (or divisive) inhibition. Unlike the excitation in the model which acts linearly on a unit's input, inhibition acts on a unit's output and hence, regulates the unit response non-linearly (i.e., given a fixed amount of inhibition and excitation, inhibition will increase with the unit's activity unlike excitation which will remained constant).

Figure 1B:
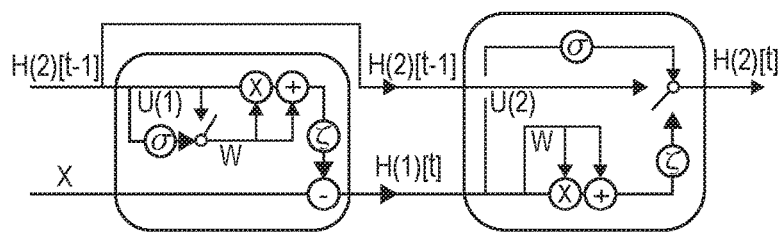
FIG. 1(b) illustrates an exemplary hGRU architecture.

Referring now to FIGS. 1(a) and 1(b), the method of the present invention involves using the concept of "gates" from the popular gated recurrent unit (GRU) architecture, and using them to control dynamics for learnable versions of arbitrary recurrent neural circuit models. FIG. 1(a) illustrates a circuit diagram of the gated recurrent unit (GRU). Gates are convolutional kernels, and denoted by $U^{(1)}$ and $U^{(2)}$, where the former selects features of the previous hidden state H[t−1] to process on the current step, and the latter interpolates an updated hidden state with H[t−1] to produce an updated H[t], which denotes a sigmoid pointwise nonlinearity, which squashes values into [0, 1], and ζ denotes a different pointwise nonlinearity, which is typically set as a rectified nonlinearity (ReLU).

FIG. 1(b) illustrates a hGRU architecture, which includes parameters that can be fit to data sets using gradient descent. Note that in the hGRU, U is a function of H [t] instead of the previous step's hidden state $H^{(2)}$[t−1].

The convolutional kernels $W^1$, $W^E \in R^{S \times S' K \times K}$ describe inhibitory vs. excitatory hypercolumn connectivity (constrained by anatomical data). The scalar parameters μ and α control linear and quadratic (i.e., shunting) inhibition by $C^{(1)} \in R^{W \times H \times K}$, γ scales excitation by $C^{(2)} \in R^{W \times H \times K}$, and ζ scales the feedforward drive. Activity at each stage is linearly rectified (ReLU) $[\bullet]_{30} = \max(\bullet, 0)$. Finally, η, #, τ and σ are time constants. To make this model amenable to modern computer vision applications, we developed a version where all parameters could be trained from data.

From Eq. 1 above, we obtain the following by rearranging the decay term:

$$\dot{H}_{xky}^{(1)} = -\eta^{-1} c^2 H_{xyk}^{(1)} + \eta^{-1} [\zeta X_{xyk} - (\alpha H_{xyk}^{(1)} + \mu) C_{xyk}^{(1)}]_+, \dot{H}_{xyk}^{(2)} = -\eta^{-1} \sigma^2 H_{xyk}^{(2)} + \tau^{-1} [\gamma C_{xyk}^{(2)}]_+, \quad (2)$$

where $[\bullet]_+ = \max(\bullet, 0)$ is the ReLU function.

Now, we would like to discretize this equation using Euler's method. We first simplify the above equation equation by choosing η=τ and σ=#:

$$\dot{H}_{xyk}^{(1)} = -\eta^{-1} c^2 H_{xyk}^{(1)} + \eta^{-1} [\zeta X_{xyk} - (\alpha H_{xyk}^{(1)} + \mu) C_{xyk}^{(1)}]_+, [_+\dot{H}_{xyk}^{(2)} = -\eta^{-1} c^2 H_{xyk}^{(2)} + \eta^{-1}] \gamma C_{xyk}^{(2)}[t]]_+).$$

Now, apply Euler's method with timestep h. This gives the following difference equation:

$$H_{xyk}^{(1)}[t] = H_{xyk}^{(1)}[t-1] + h(-\eta^{-1} c^2 H_{xyk}^{(1)} + \eta^{-1} [\zeta X_{xyk}[t-1] - (\alpha H_{xyk}^{(1)}[t-1] + \mu) C_{xyk}^{(1)}[t]]_{30})$$
$$H_{xyk}^{(2)}[t] = H_{xyk}^{(2)}[t-1] + h(-\eta^{-1} c^2 H_{xyk}^{(2)}[t-1] + \eta^{-1} [\gamma C_{xyk}^{(2)}[t]]_+).$$

Distributing h, we get:

$$H_{xyk}^{(1)}[t] = e^{-2} [\zeta X_{xyk}[t-] - (\alpha H_{xyk}^{(1)} t[t-1] + \mu) C_{xyk}^{(1)}[t]]_+, H_{xyk}^{(2)}[t] = e^{-2} [\gamma C_{xyk}^{(1)}[t]]_+. \quad (3)$$

Now, notice that if we choose h=η/ε², the first two terms on the RHS of each line will cancel:

$$H_{xyk}^{(1)}[t] = e^{-2} [\zeta X_{xyk}[t-1] - (\alpha H_{xyk}^{(1)}[t-1] + \mu) C_{xyk}^{(1)}[t]]_+, H_{xyk}^{(2)}[t] = e^{-2} [\gamma C_{xyk}^{(1)}[t]]_+.$$

We now have a discrete-time approximation of the initial dynamical system, shown in Eq. 1. Note that this model can also be thought of as a convolutional RNN with ReLU nonlinearity. The ReLUs give the model different populations of inhibitory ($H^{(1)}$) vs. excitatory ($H^{(2)}$) neurons. This is a fundamental computational principle in neuroscience (but not in computer vision), called "Dale's Law" or "Dale's Principle."

Because RNNs are difficult to train in practice, the state of the art is to incorporate learned "gates" to manage the flow of information over time.

$$G_{xyk}^{(1)}[t] = \sigma(X_{xyk} + (U^{(1)} * H^{(2)}[n-1])_{xyk} + b_k^{(1)})$$
$$G_{xyk}^{(1)}[t] = \sigma(X_{xyk} + (U^{(2)} * H^{(1)}[n])_{xyk} + b_k^{(2)}), \quad (4)$$

where σ is a squashing pointwise nonlinearity, $U^{(\cdot)}$ are convolution kernels, and $b^{(\cdot)}$ are bias vectors. Applied to Eq. 3, these gates integrate past information with new computations more flexibility than the Euler integration above:

$$H_{xyk}^{(1)}[t] = e^{-2} G_{xyk}^{(1)}[t] [\zeta X_{xyk}[t-1] - (\alpha H_{xyk}^{(1)}[t-1] + \mu) C_{xyk}^{(1)}[t]]_+ + (1 - G_{xyk}^{(1)}[t]) H_{xyk}^{(1)}[t-1]$$
$$H_{xyk}^{(2)}[t] = e^{-2} G_{xyk}^{(2)}[t] [\gamma C_{xyk}^{(2)}[t]]_+ + (1 - G_{xyk}^{(2)}) H_{xyk}^{(2)}[t-1] \quad (5)$$

This defines the simplest gated version described in Eq. 3. We modified the model in several other ways to improve its effectiveness on the visual tasks examined here:

(1) We found that using the GRU-style "gain" (Eq 3.) to control the first stage of horizontal interactions was more effective than using "mixing" gates in both stages.

(2) We found it effective to replace the $\varepsilon^{-2}$ scaling by the learned per-timestep parameter η, which can be thought of as a restricted application of batch normalization to the RNN's hidden activity to control saturating activities stabilize training.

(3) We included both linear and quadratic forms of excitation in $H^{(2)}$ for symmetry with $H^{(1)}$. Enabling the model to spread excitation via both linear and quadratic propagation is potentially useful for propagating activity based on either first- (e.g., contrast strength) or second-order (e.g., self-similarity) statistical regularities. The linear and quadratic terms are scaled per-feature by the learnable parameters α and μ when calculating $H^{(1)}$, and η and ω, and ω in $H^{(2)}$.

To summarize the general approach, we take arbitrary ordinary or partial differential equations, and discretize their dynamics (from continuous time to discrete time steps), derive a simple Euler solution, and (3) replace the Euler integrations with learnable "gate." Gate parameters are optimized using gradient descent (like the rest of the model), and emit integration constants on every step of processing (in comparison to Euler, uses constants that are fixed across the dynamics).

We extended the fGRU to not only simulate interactions between units within a single feature processing layer, but also between units in multiple feature processing layers (with operations like downsampling via pooling/subsampling meaning that these layers encode different types of representations, e.g., wheels vs. cars).

Figure 2A:
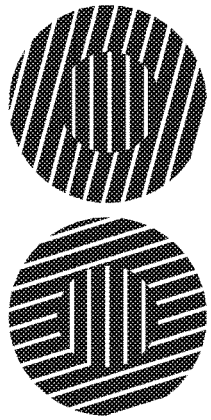
FIGS. 2(a), 2(b) and 2(c) illustrate extended recurrent circuits.

As shown in FIG. 2(a), the orientation tilt-illusion is a contextual illusion where a central grating's perceived orientation is influenced by a surround grating's orientation. When a central grating has a similar orientation as its surround, it is judged as tilting away from the surround (repulsion). When the two gratings have dissimilar orientations, the central grating is judged as tilting towards the surround (attraction).

Figure 2B:
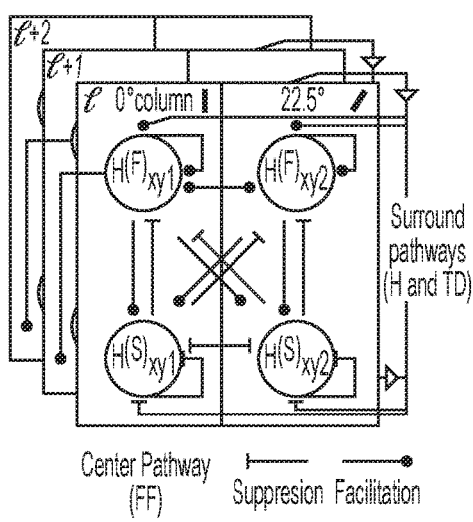

As shown in FIG. 2(b), we extend the recurrent circuit above to explain this and other contextual illusions into a hierarchical model that learns horizontal (within a layer) and top-down (between (S) layer) interactions between units. The circuit simulates dynamical suppressive ($H^{(S)}_{xyk}$) and facilitative ($H^{(F)}_{xyk}$) interactions between units in a layer l, which receives feedforward drive from a center pathway encoding feature k (e.g., edges oriented at 0° or 22.5°) at position (x, y) in an image. Blocks depict different layers, and arrowed connections denote top-down feedback.

Figure 2C:
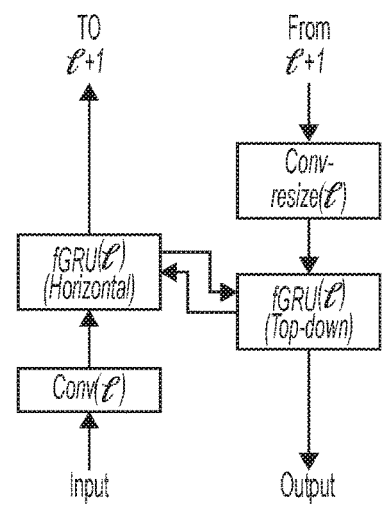

FIG. 2(c) illustrates a deep network schematic of the circuit diagram in FIG. 2(b), which forms the basis of the introduced here. Horizontal and top-down connections are implemented with feedback gated recurrent units (fGRUs). Image encodings pass through these blocks on every timestep, from bottom-up (left path) to top-down (right path), and predictions are read out from the fGRU closest to image resolution on the final timestep. This motif can be stacked to create a hierarchical model.

Our general approach for transforming recurrent circuit models from computational neuroscience extends well beyond the simple hGRU module introduced above. We can extend this procedure to develop RNN modules that (i) can be introduced into hierarchical convolutional neural network models, and (ii), used to more generally simulate connections between units within a layer (like the hGRU), or connections between units in different layers of the hierarchy. We call this new module the feedback gated recurrent unit (fGRU). We have described the evolution of fGRU recurrent units in $H \in R^{X \times Y \times K}$, which are influenced by non-negative feedforward encodings $Z \in R^{X \times Y \times K}$ (e.g., a convolutional layer's response to a stimulus) over discrete timesteps •[t]:

$G^S = \text{sigmoid}(U^S * H[t-1])$ # Compute channel-wise selection  Stage 1
$C^S = W^S * (H[t-1] \odot G^S)$ # Compute suppression interactions
$S = [Z - [(\alpha H[t-1] + \mu)C^S]_+]_+$, # Suppression of Z $G^F = $  Stage 2
$\quad \text{sigmoid}(U^F * S)$ # Compute channel-wise recurrent updates
$C_F = W^F * S$ # Compute facilitation interactions
$\tilde{H} = [\nu(C^F + S) + \omega(C^F * S)]_+$ # Facilitation of S
$H[t] = (1 - G^F) \odot H[t-1] + G^F \odot \tilde{H}$. # Update recurrent state Like the original circuit, the fGRU has separate stages for suppression (S) and facilitation (H). In the first stage, the feedforward encodings Z are suppressed by non-negative interactions between units in H[t−1] (an fGRU hidden state from the previous timestep). Suppressive interactions are computed with the kernel $W^S \in R^{E \times E \times K \times K}$, where E describes the spatial extent of horizontal connections on a single timestep. This kernel is convolved with a gated version of the persistent hidden state H[t−1]. The gate activity $G^F$ is computed by applying a sigmoid nonlinearity to a convolution of the kernel $U^F \in R^{1 \times 1 \times K \times K}$ with H[t−1], which transforms its activity into the range [0, 1]. Additive and multiplicative forms of suppression are controlled by the parameters $\mu$, $\alpha \in R^K$, respectively.

In the second stage, additive and multiplicative facilitation is applied to the instantaneous activity S. The kernels $W^F \in R^{E \times E \times K \times K}$ controls facilitation interactions. Additive and multiplicative forms of facilitation are scaled by the parameters v, $\omega \in R^K$, respectively. A gate activity is also computed during this stage to update the persistent recurrent activity H. The gate activity $G^F$ is computed by applying a sigmoid to a convolution of the kernel $U^F \in R^{1 \times 1 \times K \times K}$ with S. This gate updates H[t] by interpolating H[t−1] with the candidate activity $\tilde{H}$. After every timestep of processing, H[t] is taken as the fGRU output activity. As detailed below, the fGRU output hidden state is either passed to the next convolutional layer (FIG. 2(c), $fGRU^{(l)} \rightarrow conv^{(l+1)}$), or used to compute top-down connections (FIG. 2(c), $fGRU^{(l+1)} \rightarrow fGRU^{(l)}$).

The fGRU has different configurations for learning horizontal connections between units within a layer or top-down connections between layers (FIG. 2(b)). These two configurations stem from changing the activities used for a fGRU's feedforward encodings and recurrent hidden state. "Horizontal connections" between units within a layer are learned by setting the feedforward encodings Z to the activity of a preceding convolutional layer, and setting the hidden state H to a persistent activity initialized as zeros (FIG. 2(c), $conv^{(l)} \rightarrow fGRU^{(l)}$). "Top-down connections" between layers are learned by setting fGRU feedforward encodings Z to the persistent hidden state $H^{(l)}$ of a fGRU at layer 1 in a hierarchical model, and the hidden state H to the persistent activity $H^{(l+1)}$ of an fGRU at a layer one level up in the model hierarchy (FIG. 2(c), $fGRU^{(l+1)} \rightarrow fGRU^{(l)}$). The functional interpretation of the top-down fGRU is that it first suppresses activity in the lower layer using the higher layer's recurrent horizontal activities, and then applies a kernel to the residue for facilitation, which allows for computations like interpolation, sharpening, or "filling in". Note that an fGRU for top-down connections does not have a persistent state (it mixes high and low-level persistent states), but an fGRU for horizontal connections does.

In summary, compared to other standard recurrent neural networks (RNNs), the fGRU distinguishes itself in that:

(1) It implements "dale's law", a classic principle from neuroscience which states there are separate pools of inhibitory vs. excitatory neurons (see $H^{(1)}$ vs. $H^{(2)}$, respectively, in the equations below).

(2) It implements subtractive and divisive (multiplicative) forms of inhibition (detailed below as $\mu$ vs. $\alpha$), which are canonical computations from neuroscience that we found were important for explaining human perception.

(3) It uses normalizations on its center-surround interactions, which help control for vanishing gradients and exploding activations.

One key drawback for training RNNs, especially for vision tasks, is the standard learning algorithm, Back-Propagation Through Time (BPTT). Training RNNs with BPTT incurs a memory cost that is linear in steps of processing (i.e., granularity of dynamics), making it difficult to train vision RNNs that can compete with state-of-the-art models, which are not recurrent. We have introduced a novel learning algorithm that overcomes this drawback, which we call Contractor-Recurrent Back-Prop (C-RBP).

BPTT is the standard learning algorithm for optimizing recurrent parameters $w_F$ with respect to a loss $L(\tilde{y}, y)$. It is implemented by replicating a dynamical system and accumulating its gradients over N timesteps (Eq. 6, K=0).

$$\frac{\partial \mathcal{L}}{\partial w_F} = \frac{\partial \mathcal{L}}{\partial \tilde{y}} \frac{\partial \tilde{y}}{\partial h_T} \sum_{k=K}^{k=T-1} \left( \prod_{i=T}^{i=T-k} J_F(h_i) \right) \frac{\partial F}{\partial w_F}(x, h_{T-k}, w_F). \quad (6)$$

This algorithm stores every $h_t$ in memory during the forward pass, causing a memory footprint that linearly increases with steps.

We build on a classic learning algorithm, Recurrent Back-Prop, which incurs no memory cost with increasing steps. This algorithm works decently well for training RNNs on sequence-learning tasks, but not at all when applied to computer vision models.

We demonstrate that this limitation relates to central assumptions of the learning algorithm which are violated by the hyperparameters used in computer vision models. Namely, to satisfy assumptions of the Implicit Function Theorem which RBP leverages, the Jacobian of an RNN must be invertible. This is not the case for computer vision models, which are designed for "expressivity", not stability (contraction map), which would yield the desirable Jacobian properties.

We demonstrate that this limitation relates to central assumptions of the learning algorithm which are violated by the hyperparameters used in computer vision models. Namely, to satisfy assumptions of the Implicit Function Theorem which RBP leverages, the Jacobian of an RNN must be invertible. This is not the case for computer vision models, which are designed for "expressivity", not stability (contraction map), which would yield the desirable Jacobian properties. We correct this deficiency with the "Lipschitz-Constant Penalty", which we prove guarantees that an RNN will satisfy the constraints of RBP. Pairing this penalty with RBP yields our C-RBP learning algorithm.

We demonstrate that a deep vision model with fGRUs trained using C-RBP outperforms state-of-the-art feedforward models at "Panoptic Segmentation" (a combination of instance and semantic segmentation).

Figure 3:
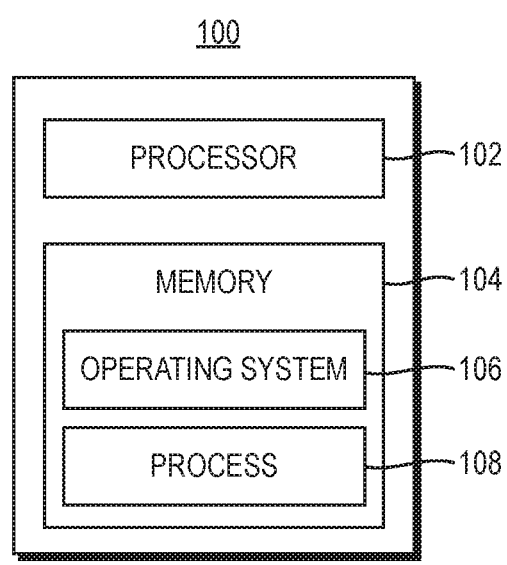
FIG. 3 is a block diagram of an exemplary computer system.

Methods of the present invention can only be executed on a computer resource such as that shown in FIG. 3. More specifically, referring to FIG. 3, an exemplary computer system 100 includes at least a processor 102 and a memory 104. The memory 104 includes at least an operating system 106, such as Linux® or Windows®, and one or more processes 108 to generate the recurrent neural circuits described above.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
   providing a computer system, the computer system including at least a processor and a memory, the memory comprising at least an operating system;
   executing a process in the memory, the process comprising:
   providing a recurrent circuit model; and converting the recurrent circuit model into a recurrent neural network that can be fit with gradient descent, wherein converting comprises applying a first stage and applying a second stage,
   wherein applying the first stage comprises:
   suppressing feedforward encodings Z by non-negative interactions between units in H[t−1], a feedback gated recurrent unit (fGRU) hidden state from a previous timestep;
   computing suppressive interactions with a kernel $W^S \in R^{E \times E \times K \times K}$ wherein E describes a spatial extent of horizontal connections on a single timestep, S is another population of neurons without hidden states, R is a set of real numbers and K is a number of channels of the Kernel;
   convolving the kernel a gated version of a persistent hidden state H[t−1]; and
   computing a gate activity $G^f$ by applying a sigmoid nonlinearity to a convolution of the kernel $U^F \in R^{1 \times 1 \times K \times K}$ with H[t−1], transforming its activity into the range [0, 1].

2. The method of claim 1 wherein additive and multiplicative forms of suppression are controlled by parameters μ, $\alpha \in R^K$, respectively, wherein μ and α control linear and non-linear forms of suppressive computations.

3. The method of claim 2 wherein applying the second stage comprises:
   applying additive and multiplicative facilitation to an instantaneous activity S, the kernels $W^F \in R^{E \times E \times K \times K}$ controlling facilitation interactions;
   scaling additive and multiplicative forms of facilitation are by the parameters v, $\omega \in R^K$, respectively, wherein v and ω control linear and non-linear forms of facilitative computations; and
   computing a gate activity $G^F$ to update the persistent recurrent activity H.

4. The method of claim 3 wherein computing the gate activity $G^F$ comprises applying a sigmoid to a convolution of the kernel $U^F \in R^{1 \times 1 \times K \times K}$ with S, wherein the gate activity $G^F$ updates H[t] by interpolating H[t−1] with the candidate activity ft the H[t] taken as a fGRU output activity.

5. The method of claim 4 wherein the fGRU output hidden state is either passed to the next convolutional layer or used to compute top-down connections.

* * * * *